United States Patent
Lin et al.

(10) Patent No.: US 10,491,637 B2
(45) Date of Patent: Nov. 26, 2019

(54) IDENTIFYING USER PROFILES TO EVALUATE AGAINST POLICIES ENFORCED BY AN ONLINE SYSTEM BASED ON CONNECTIONS BETWEEN CONTENT ITEMS, USER PROFILES, AND OBJECTS MAINTAINED BY THE ONLINE SYSTEM

(71) Applicant: Facebook, Inc., Menlo Park, CA (US)

(72) Inventors: Jiun-Ren Lin, Cupertino, CA (US); Daniel Olmedilla de la Calle, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 274 days.

(21) Appl. No.: 15/664,538

(22) Filed: Jul. 31, 2017

(65) Prior Publication Data

US 2019/0036966 A1   Jan. 31, 2019

(51) Int. Cl.
*H04L 29/06* (2006.01)
*G06F 16/901* (2019.01)
*G06Q 30/02* (2012.01)

(52) U.S. Cl.
CPC .......... *H04L 63/20* (2013.01); *G06F 16/9024* (2019.01); *H04L 63/102* (2013.01); *G06Q 30/0277* (2013.01); *H04L 63/1425* (2013.01)

(58) Field of Classification Search
CPC ... H04L 63/20; H04L 63/102; H04L 63/1425; G06F 16/9024; G06Q 30/0277
USPC ...................................................... 726/1, 26
See application file for complete search history.

(56) References Cited

U.S. PATENT DOCUMENTS

| | | | | |
|---|---|---|---|---|
| 8,805,996 | B1* | 8/2014 | Gauvin | H04L 12/1895 709/204 |
| 2009/0138592 | A1* | 5/2009 | Overcash | H04L 63/1425 709/224 |
| 2009/0254489 | A1* | 10/2009 | Geller | G06Q 40/06 705/36 R |
| 2010/0125911 | A1* | 5/2010 | Bhaskaran | G06Q 10/10 726/23 |
| 2013/0097701 | A1* | 4/2013 | Moyle | G06F 21/552 726/22 |
| 2013/0198815 | A1* | 8/2013 | Piliouras | H04L 63/10 726/4 |
| 2014/0189861 | A1* | 7/2014 | Gupta | H04L 63/08 726/22 |

(Continued)

*Primary Examiner* — Samson B Lemma
(74) *Attorney, Agent, or Firm* — Fenwick & West LLP

(57) ABSTRACT

An online system reviews various user profiles for compliance with policies enforced by the online system. However, users may attempt to subvert action by the online system by creating additional user profiles for presenting content. Accordingly, the online system generates a graph identifying connections user profiles, content items associated with the user profiles, and objects identified by the content items. User profiles, content items, or objects previously identified to have violated one or more policies enforced by the online system are identified via the graph. The online system computes a profile score for various user profiles based on a probability of reaching an object, user profile, or content item identified as violating a policy through a random walk in the graph. Based on the profile scores, the online system trains to identify user profiles for review against one or more enforced policies.

20 Claims, 3 Drawing Sheets

(56) References Cited

U.S. PATENT DOCUMENTS

2016/0063548 A1\* 3/2016 Simo ................. G06Q 30/0255
  705/14.53
2017/0061462 A1\* 3/2017 Bhalgat ............. G06Q 30/0225
2017/0068964 A1\* 3/2017 Gevka ................. G06Q 30/018
2017/0302679 A1\* 10/2017 Caramico ............ H04L 63/105

\* cited by examiner

IDENTIFYING USER PROFILES TO EVALUATE AGAINST POLICIES ENFORCED BY AN ONLINE SYSTEM BASED ON CONNECTIONS BETWEEN CONTENT ITEMS, USER PROFILES, AND OBJECTS MAINTAINED BY THE ONLINE SYSTEM

BACKGROUND

This disclosure relates generally to presenting content to users of an online system, and more specifically to identifying user profiles likely to violate one or more policies enforced by the online system to regulate presentation of content.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users. An online system may also generate content for presentation to a user, such as content describing actions taken by other users on the online system.

Additionally, many online systems commonly allow publishing users (e.g., businesses) to sponsor presentation of content on an online system to gain public attention for a user's products or services or to persuade other users to take an action regarding the publishing user's products or services. Content for which the online system receives compensation in exchange for presenting to users is referred to as "sponsored content." Many online systems receive compensation from a publishing user for presenting online system users with certain types of sponsored content provided by the publishing user. Frequently, online systems charge a publishing user for each presentation of sponsored content to an online system user or for each interaction with sponsored content by an online system user. For example, an online system receives compensation from a publishing user each time a content item provided by the publishing user is displayed to another user on the online system or each time another user is presented with a content item on the online system and interacts with the content item (e.g., selects a link included in the content item), or each time another user performs another action after being presented with the content item.

Additionally, many online systems enforce one or more policies to prevent certain content from being presented to users. In various embodiments, the online system identifies content items including harmful or offensive content and withholds presentation of the identified content items to online system users. Many online systems identify user profiles associated with at least a threshold number of content items identified as violating one or more of the enforced policies and subsequently prevent presentation of other content items associated with the identified user profiles to online system users. This allows online systems to prevent user profiles that have provided harmful or offensive content items, or content items that otherwise violate policies enforced by the online systems from continuing to provide content items via the online system. However, conventional online systems are limited to identifying user profiles providing content violating one or more enforced polices until after content items associated with the user profiles have been identified as not complying with one or more enforced policies. Many conventional online systems do not evaluate each content item or user profile for compliance with one or more enforced policies, but often wait until users provide complaints about presented content items associated with user profiles. This delay allows users to circumvent policies enforced by conventional online systems by establishing new user profiles and providing content items to the online system associated with the new user profiles, as conventional online systems fail to evaluate the new user profile until content associated with the new user profiles have been provided to some online system users.

SUMMARY

An online system presents various content items to its users. The online system obtains content items from various publishing users and presents the content items to other users. However, to enhance user interaction with presented content items, the online system enforces one or more policies regulating presentation of content items. For example, a policy prevents presentation of content items including content identified as harmful or offensive by the online system. As another example, a policy prevents the online system from presenting content items associated with objects identified as harmful or offensive by the online system.

In another example, a policy enforced by the online system prevents presentation of content items received from, or associated with, users who have performed certain actions or who have certain characteristics. For example, a policy enforced by the online system identifies user profiles associated with certain actions or having certain characteristics. Subsequently, if a publishing user associated with an identified user profile provides additional content items to the online system for presentation, the online system withholds the additional content items from presentation to other users. The online system stores information identifying user profiles determined to violate one or more policies enforced by the online system, and subsequently determines whether received content items are associated with a user profile previously identified as violating one or more of the enforced policies. This allows the online system to prevent presentation of content items associated with certain user profiles to other users, which may prevent the online system from presenting users with content items associated with certain user profiles to increase a quality or a relevance of content items presented to other users. However, certain users may attempt to circumvent policies enforced by the online system by establishing new user profiles and using the new user profiles to provide content items to the online system. Because the new user profiles are not associated with the certain actions or certain characteristics that violate the policy enforced by the online system, the online system does not withhold content items associated with the new user profiles from presentation to other users. This may decrease the quality or relevance of content items presented by the online system to various users, decreasing user interaction with content items presented by the online system.

When enforcing various policies, the online system may identify content items, objects maintained by the online system, or users determined to have violated one or more policies enforced by the online system. The online system stores information identifying user profiles, users, content items, or objects determined to have violated one or more policies enforced by the online system. This allows the online system to subsequently modify content items presented to users by accounting for relationships between content items and other content items, objects, users, or user profiles identified as violating one or more policies enforced by the online system when selecting content items for presentation to various users.

To prevent users from circumventing one or more policies enforced by the online system, when the online system obtains content items that are each associated with a user profile maintained by the online system, the online system determines connections between various content items and user profiles authorized to perform one or more actions associated with the content items. Additionally, different content items specify objects maintained by the online system. For example, a content item specifies a page of content or an event maintained by the online system, allowing presentation of the content item to online system users to increase awareness of or interaction with the object specified by the content item.

The online system determines connections between each of at least a set of user profiles and content items associated with user profiles of the set based on information included in content items or obtained in conjunction with the content item. When the online system obtains a content item from a publishing user, the online system also obtains information identifying a user profile corresponding to the publishing user. Additionally, the publishing user may also identify user profiles of users authorized to perform one or more actions associated with the content item. For example, if the publishing user is a business, the publishing user identifies user profiles of specific users authorized to modify the content item, to access the content item, or to perform other actions associated with the content item. The online system stores the obtained content item and connections between the obtained content item and user profiles included in the content item or received along with the obtained content item.

Similarly, based on information included in various obtained content items, the online system determines connections between objects specified by various obtained content items. In various embodiments, a content item includes information identifying an object maintained by the online system. For example, a content item includes an identifier of a page maintained by the online system that is described by content included in the content item or that is retrieved if a user accesses the content item. The online system stores a connection between an obtained content item and an object maintained by the online system specified by the content item. In some embodiments, the online determines connections between each content item obtained by the online system and objects specified by the obtained content item; information describing the determined connections between content items and objects is stored by the online system. Alternatively, the online system determines connections between obtained content items having one or more specific characteristics (e.g., content items including a bid amount) and objects specified by the obtained content items having the specific characteristics.

Additionally, based on information maintained by the online system for various objects specified by obtained content items, the online system determines connections between objects specified by various content items and user profiles maintained by the online system. Different users may be capable of performing various actions involving an object, and the object is associated with information, or includes information, identifying user profiles of users capable of performing the various actions involving the object. For example, a page maintained by the online system includes information identifying user profiles of users capable of providing content to the page, of modifying content included on the page, of providing messages to users on behalf of the page, or of performing any other suitable actions associated with the page. Based on information included in an object or associated with an object, the online system 140 identifies user profiles corresponding to users who are authorized to perform one or more actions associated with the object and determines connections between the object and the identified user profiles. The online system stores the determined connections in association with the object and the identified user profiles.

Based on the connections between user profiles and content items, connections between content items and objects specified by the content items, and connections between user profiles and objects, the online system generates a graph describing relationships between user profiles, content items, and objects. The graph allows the online system to identify relationships between user profiles and content items, between content items and objects, as well as between objects and user profiles. In the graph, the online system identifies user profiles, content items, and objects that the online system previously determined to have violated one or more policies enforced by the online system. In various embodiments, the online system accesses stores information identifying content items, user profiles, or objects determined to violate one or more policies enforced by the online system and associates a value or indicator with user profiles, content items, or objects identified by the stored information as previously determined to have violated at least one policy enforced by the online system.

Using the generated graph, the online system determines profile scores for user profiles of the set based on the identified content items, objects, and user profiles and the connections in the graph between user profiles and content items, between user profiles and objects, and between content items and objects. In various embodiments, the online system 140 determines a profile score for a user profile based on probabilities of traversing connections in the graph from the user profile to an identified user profile, to an identified object, or to an identified content item. For example, the online system determines the profile score for a user profile as a probability of traversing connections in the graph from the user profile to an identified user profile, to an identified content item, or to an identified object. In various embodiments, when determining a profile score for a user profile, the online system also accounts for probabilities of reaching identified user profiles, identified objects, or identified content items from objects and content items connected to the user profile. Hence, when determining the profile score for a user profile, the online system retrieves objects and content items connected to the user profile via the graph. For each object connected to the user profile via the graph, the online system determines an object score based on probabilities of reaching an identified user profile, an identified object, or an identified content item by traversing the connections in the graph from the object via a random walk. Similarly, the online system determines a content item score based on probabilities of reaching an identified user profile, an identified object, or an identified content item from the content item by traversing the connections in the graph via a random walk. The online system combines the content item score and the object score with the user profile score to determine a score for the user profile.

To identify user profiles likely to violate one or more enforced policies, the online system generates a model determining a likelihood that a user profile violates one or more of the enforced policies based on characteristics of the user profile. The online system generates the model based on profile scores determined for various user profiles via the graph and characteristics of user profiles for which profile scores were determined. For example, the online system trains a machine learned model using a profile score determined for a user profile from the graph and characteristics of the user profile for which the profile score was determined. In some embodiments, the model is a gradient boosting decision tree model generated from characteristics of user profiles and user profile scores determined for each user profile via the graph.

The online system subsequently applies the model to an additional user profile that is not included in the graph to determine a likelihood of the additional user violating one or more policies enforced by the online system. Based on characteristics of the additional user profile, the model determines a likelihood of the additional user profile violating one or more policies enforced by the online system. For example, when the online system receives one or more content items associated with the additional user profile, the online system applies the model to characteristics of the additional user profile. If the likelihood equals or exceeds a threshold value, the online system performs one or more remedial actions regarding the additional user profile. For example, if the likelihood equals or exceeds the threshold value, the online system identifies the additional user profile or received content items associated with the additional user profile for manual review for compliance with the one or more policies enforced by the online system. This allows the online system to leverage connections between user profiles and other user profiles, objects, and content items identified as violating one or more of the enforced policies to identify user profiles for which the online system has not determined connections to objects or content items likely to violate one or more of the enforced policies. Application of the model to characteristics of the additional user profile allows the online system prevent various publishing users from circumventing policies enforced by the online system by creating new user profiles for which the online system has limited information to evaluate for compliance with the one or more enforced policies.

BRIEF DESCRIPTION OF THE DRAWINGS

FIG. 2 is a block diagram of an online system, in accordance with an embodiment of.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
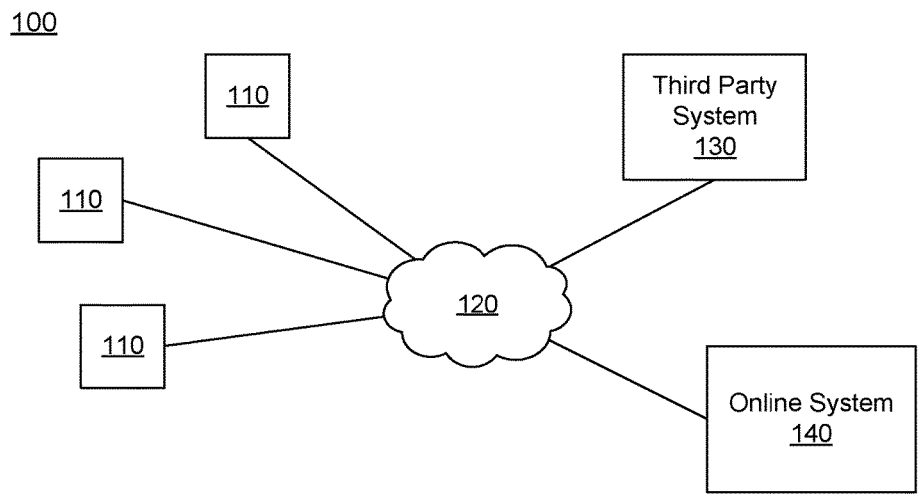
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Various third party systems 130 provide content to users of the online system 140. For example, a third party system 130 maintains pages of content that users of the online system 140 may access through one or more applications executing on a client device 110. The third party system 130 may provide content items to the online system 140 identifying content provided by the online system 130 to notify users of the online system 140 of the content provided by the third party system 130. For example, a content item provided by the third party system 130 to the online system 140 identifies a page of content provided by the online system 140 that specifies a network address for obtaining the page of content. If the online system 140 presents the content item to a user who subsequently accesses the content item via a client device 110, the client device 110 obtains the page of content from the network address specified in the content item. This allows the user to more easily access the page of content.

Figure 2:
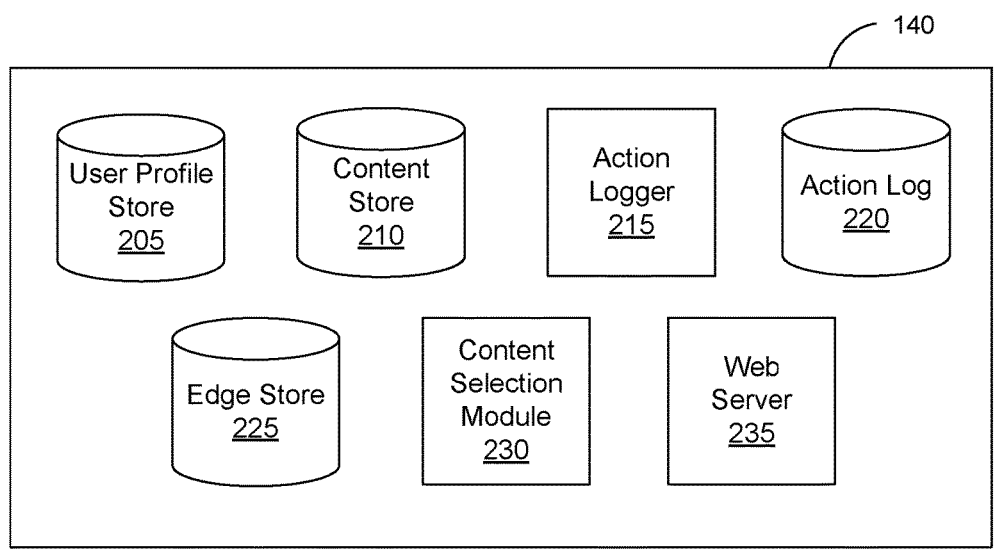

FIG. 2 is a block diagram of an architecture of the online system 140. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image, with information identifying the images in which a user is tagged stored in the user profile of the user. A user profile in the user profile store 205 may also maintain references to actions by the corresponding user performed on content items in the content store 210 and stored in the action log 220.

Each user profile includes user identifying information allowing the online system 140 to uniquely identify users corresponding to different user profiles. For example, each user profile includes an electronic mail ("email") address, allowing the online system 140 to identify different users based on their email addresses. However, a user profile may include any suitable user identifying information associated with users by the online system 140 that allows the online system 140 to identify different users.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other social networking system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." The content store 210 includes information associated with various objects identifying user profiles of users authorized to perform various actions associated with the object. For example, the content store 210 includes an object as well as user profiles associated with the object that identify users capable of modifying content of the object, modifying characteristics of the object, communicating with other users on behalf of the object, or performing any other suitable action associated with the object. A user creating an object may identify the user profiles when creating the object or may subsequently provide the online system 140 with information identifying the object, one or more user profiles, and actions associated with the object that users corresponding to different user profiles are capable of performing. Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include content for presentation to a user and a bid amount. The content is text, image, audio, video, or any other suitable data presented to a user. In various embodiments, the content also specifies a page of content or other object maintained by the online system 140. For example, a content item includes a landing page specifying a network address of a page of content to which a user is directed when the content item is accessed. As another example, a content item includes an identifier of an object (e.g., a page) maintained by the online system 140 that is specified or described by the content of the content item presented to users. The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In various embodiments, the content store 210 includes multiple campaigns, which each include one or more content items. In various embodiments, a campaign in associated with one or more characteristics that are attributed to each content item of the campaign. For example, a bid amount associated with a campaign is associated with each content item of the campaign. Similarly, an objective associated with a campaign is associated with each content item of the campaign. In various embodiments, a user providing content items to the online system 140 provides the online system 140 with various campaigns each including content items having different characteristics (e.g., associated with different content, including different types of content for presentation), and the campaigns are stored in the content store 210 for subsequent retrieval by the content selection module 230, which is further described below.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

Additionally, content items received by the online system 140 may include information identifying user profiles maintained by the online system 140. For example, a content item includes information identifying a user profile of a publishing user providing the content item to the online system 140. Various content items may also identify user profiles corresponding to users who are authorized to perform various actions associated with the content item. For example, a content item includes information identifying user profiles of users authorized to modify content or characteristics of the content item, of users to whom information describing presentation of the content item is provided, or of users capable of performing any suitable action associated with the content item.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

In various embodiments, the edge store 225 also maintains a graph describing connections between various user profiles, content items, and objects. A connection in the graph represents a relationship between a user profile and a content item, between a content item and an object, or between a user profile and an object. In various embodiments, a connection between a content item and a user profile indicates a user associated with the user profile is authorized to perform one or more actions associated with the content item or that the user associated with the user profile provided the content item to the online system 140. Hence, a connection between a user profile and a content item indicate that the content store 210 includes information associating the user profile and the content item indicating the user profile is authorized to perform one or more actions associated with the content item. Similarly, a connection between a user profile and an object indicates the content store 210 includes information indicating the user profile corresponds to a user authorized to perform one or more actions associated with the object. A connection between a content item and an object indicates that the content item in the content store 210 includes information identifying the object in the content store 210. Hence, the graph included in the edge store 225 identifies relationships between user profiles, content items, and objects. An example graph is further described below in conjunction with FIG. 4.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

Content items eligible for presentation to the user may include content items associated with bid amounts. The content selection module 230 uses the bid amounts associated with ad requests when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the ad request's bid amount and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content to a user of the online system 140. The feed may include one or more content items associated with bid amounts and other content items, such as stories describing actions associated with other online system users connected to the user, which are not associated with bid amounts. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a newsfeed including a plurality of content items selected for presentation to the user. One or more content items may also be included in the feed. The content selection module 230 may also determine the order in which selected content items are presented via the feed. For example, the content selection module 230 orders content items in the feed based on likelihoods of the user interacting with various content items.

When presenting content items to various users, the content selection module 230 enforces one or more policies that regulate content items presented to various users. Various policies withhold content items having certain characteristics (e.g., including harmful or offensive content) or associated with user profiles that have previously provided at least a threshold number of content items violating one or more polices from inclusion in one or more selection processes. As another example, a policy prevents the online system from presenting content items associated with objects identified as harmful or offensive. In another example, a policy enforced by the online system prevents presentation of content items received from, or associated with, user profiles having certain characteristics (e.g., including specific information). The content selection module 230 may use various processes to evaluate content items, user profiles, or objects against policies enforced by the content selection module 230. For example, the content selection module 230 provides various content items, user profiles, or objects to users for manual review for compliance with one or more policies. As another example, the content selection module 230 applies one or more models to content items, user profiles, or objects to determine wither the content items, objects, or user profiles comply with polices enforced by the content selection module 230. To enforce one or more policies, the content selection module 230 withholds content items associated with user profiles identified as violating a policy from selection processes.

However, certain users may attempt to circumvent policies enforced by the online system by establishing additional user profiles that have not been identified as violating one or more enforced policies and associating content items with the additional user profiles. Because the additional user profiles are not identified as violating one or more policies, the content selection module 230 does not withhold content items associated with the additional user profiles from presentation to other users. To more efficiently identify user profiles violating enforced policies and withholding content items associated with the identified user profiles from content selection processes. The content selection module 230 accesses the edge store 225 and retrieves the graph identifying connections between user profiles and content items, between content items and objects, and between objects and user profiles. Within the retrieved graph, the content selection module 230 identifies content items, user profiles, or objects previously determined to violate one or more of the enforced policies.

As further described below in conjunction with FIG. 3, the content selection module 230 generates profile scores for various user profiles included in the graph. The content selection module 230 generates a profile score for a user profile by determining a probability of traversing connections in the graph from the user profile to a user profile, an object, or a content item identified as violating one or more policies. For example, the content selection module 230 determines a probability of a random walk through the graph from a user profile to user profiles, content items, or objects identified as violating one or more enforced policies and determines a profile score for the user profile based on the probability. As further described below in conjunction with FIG. 3, the content selection module 230 generates a model based on profile scores for user profiles in the graph and characteristics of the user profiles in the graph. The model determines a likelihood of an additional user profile, which is not included in the graph, violating one or more policies enforced by the content selection module 230. If the model determines an additional user profile has at least a threshold likelihood of violating one or more policies enforced by the content selection module 230, the content selection module 230 performs one or more remedial actions regarding the additional user profile. For example, the content selection module 230 identifies the additional user profile for manual review if the model determines the additional user profile has at least a threshold likelihood of violating one or more policies enforced by content selection module 230.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or BlackberryOS.

Figure 3:
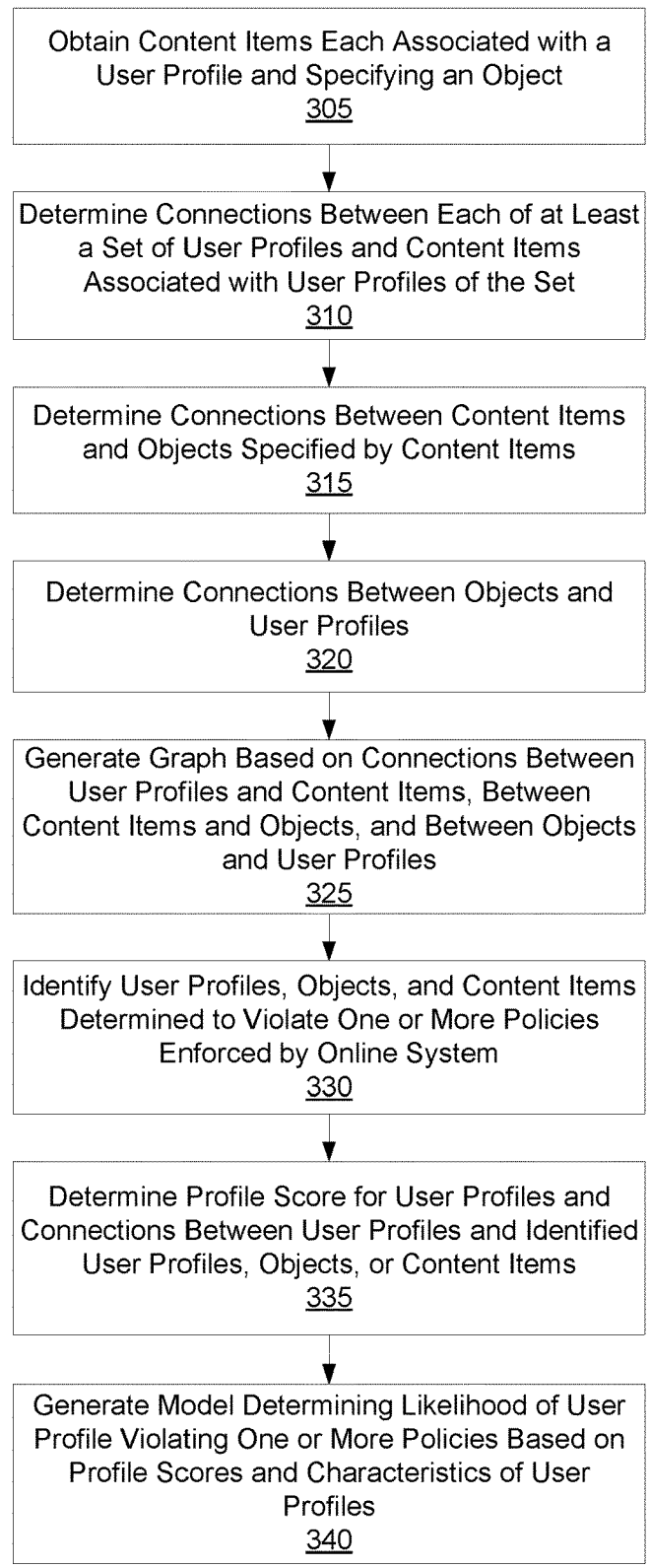
FIG. 3 is a flowchart of a method for determining likelihoods that one or more user profiles violate one or more policies enforced by an online system, in accordance with an embodiment.

Determining Likelihoods of a User Profile Violating One or More Polices Enforced by an Online System FIG. 3 is a flowchart of one embodiment of a method for determining likelihoods that one or more user profiles violate one or more policies enforced by an online system 140. In other embodiments, the method may include different and/or additional steps than those shown in FIG. 3. Additionally, steps of the method may be performed in different orders than the order described in conjunction with FIG. 3 in various embodiments.

The online system 140 presents content items to various users, and allows publishing users to provide content items to the online system 140 for presentation to other users. As further described above in conjunction with FIG. 2, the online system 140 may receive compensation from various publishing users in exchange for presenting content items to other users. However, to enhance user interaction with presented content items, the online system 140 enforces one or more policies regulating presentation of content items. For example, a policy prevents presentation of content items including content identified as harmful or offensive by the online system 140. As another example, a policy prevents the online system 140 from presenting content items associated with objects identified as harmful or offensive by the online system 140. In another example, a policy enforced by the online system 140 prevents presentation of content items received from, or associated with, users who have performed certain actions or who have certain characteristics.

For example, a policy enforced by the online system 140 identifies user profiles associated with certain actions or having certain characteristics. Subsequently, if a publishing user associated with an identified user profile provides additional content items to the online system 140 for presentation, the online system 140 withholds the additional content items from presentation to other users. The online system 140 stores information identifying user profiles determined to violate one or more policies enforced by the online system 140, and subsequently determines whether received content items are associated with a user profile previously identified as violating one or more of the enforced policies. This allows the online system 140 to prevent presentation of content items associated with certain user profiles to other users, which may prevent the online system 140 from presenting users with content items associated with certain user profiles to increase a quality or a relevance of content items presented to other users. However, certain users may attempt to circumvent policies enforced by the online system 140 by establishing new user profiles and using the new user profiles to provide content items to the online system 140. Because the new user profiles are not associated with the certain actions or certain characteristics that violate the policy enforced by the online system 140, the online system 140 does not withhold content items associated with the new user profiles from presentation to other users. This may decrease the quality or relevance of content items presented by the online system 140 to various users, decreasing user interaction with content items presented by the online system 140.

When enforcing various policies, the online system 140 may identify content items, objects maintained by the online system, or users determined to have violated one or more policies enforced by the online system. The online system 140 stores information identifying user profiles, users, content items, or objects determined to have violated one or more policies enforced by the online system 140. This allows the online system 140 to subsequently modify content items presented to users by accounting for relationships between content items and other content items, objects, users, or user profiles identified as violating one or more policies enforced by the online system 140 when selecting content items for presentation to various users.

To prevent users from circumventing one or more policies enforced by the online system, when the online system 140 obtains 305 content items that are each associated with a user profile maintained by the online system 140, the online system 140 determines 310 connections between various content items and user profiles authorized to perform one or more actions associated with the content items. Additionally, different content items specify objects maintained by the online system. For example, a content item specifies a page of content or an event maintained by the online system, allowing presentation of the content item to online system users to increase awareness of or interaction with the object specified by the content item. However, a content item may specify any suitable object maintained by, or capable of being identified by, the online system 140.

The online system 140 determines 310 connections between each of at least a set of user profiles and content items associated with user profiles of the set based on information included in content items or obtained in conjunction with the content item. When the online system 140 obtains 305 a content item from a publishing user, the online system 140 also obtains information identifying a user profile corresponding to the publishing user. Additionally, the publishing user may also identify user profiles of users authorized to perform one or more actions associated with the content item. For example, if the publishing user is a business, the publishing user identifies user profiles of specific users authorized to modify the content item, to access the content item, or to perform other actions associated with the content item. The online system 140 stores the obtained content item and connections between the obtained content item and user profiles included in the content item or received along with the obtained content item.

Similarly, based on information included in various obtained content items, the online system 140 determines 315 connections between objects specified by various obtained content items. In various embodiments, a content item includes information identifying an object maintained by the online system 140. For example, a content item includes an identifier of a page maintained by the online system 140 that is described by content included in the content item or that is retrieved if a user accesses the content item. The online system 140 stores a connection between an obtained content item and an object maintained by the online system 140 specified by the content item. In some embodiments, the online system 140 determines 315 connections between each content item obtained 305 by the online system 140 and objects specified by the obtained content item; information describing the determined connections between content items and objects is stored by the online system 140. Alternatively, the online system 140 determines 315 connections between obtained content items having one or more specific characteristics (e.g., content items including a bid amount) and objects specified by the obtained content items having the specific characteristics.

Additionally, based on information maintained by the online system 140 for various objects specified by obtained content items, the online system 140 determines 320 connections between objects specified by various content items and user profiles maintained by the online system 140. Different users may be capable of performing various actions involving an object, and the object is associated with information, or includes information, identifying user profiles of users capable of performing the various actions involving the object. For example, a page maintaining by the online system 140 includes information identifying user profiles of users capable of providing content to the page, of modifying content included on the page, of providing messages to users on behalf of the page, or of performing any other suitable actions associated with the page. Based on information included in an object or associated with an object, the online system 140 identifies user profiles corresponding to users who are authorized to perform one or more actions associated with the object and determines 320 connections between the object and the identified user profiles. The online system 140 stores the determined connections in association with the object and the identified user profiles. In various embodiments, the online system 140 determines 320 connections between each object specified by an obtained content item and user profiles of users capable of performing one or more actions associated with the object specified by an obtained content item.

Based on the connections between user profiles and content items, connections between content items and objects specified by the content items, and connections between user profiles and objects, the online system 140 generates 325 a graph describing relationships between user profiles, content items, and objects. The graph allows the online system 140 to identify relationships between user profiles and content items, between content items and objects, as well as between objects and user profiles. In the graph, the online system 140 identifies 330 user profiles, content items, and objects that the online system 140 previously determined to have violated one or more policies enforced by the online system 140. As further described above, the online system 140 stores information identifying content items, user profiles, or objects determined to violate one or more policies enforced by the online system 140. Hence, the online system 140 accesses the stored information and associates a value or indicator with user profiles, content items, or objects identified by the stored information as previously determined to have violated at least one policy enforced by the online system 140.

To determine whether user profiles violate one or more policies enforced by the online system 140, the online system 140 determines 335 profile scores for user profiles of the set based on the identified content items, objects, and user profiles and the connections in the graph between user profiles and content items, between user profiles and objects, and between content items and objects. In various embodiments, the online system 140 determines 335 a profile score for a user profile based on probabilities of traversing connections in the graph from the user profile to an identified user profile, to an identified object, or to an identified content item. For example, the online system 140 determines 335 the profile score for a user profile as a probability of traversing connections in the graph from the user profile to an identified user profile, to an identified content item, or to an identified object. However, in other embodiments, the online system 140 may use any suitable method for determining a probability of traversing the graph from a user profile to an identified user profile, an identified object, or an identified content item determined to have violated one or more policies enforced by the online system 140.

In various embodiments, when determining 335 a profile score for a user profile, the online system 140 also accounts for probabilities of reaching identified user profiles, identified objects, or identified content items from objects and content items connected to the user profile. Hence, when determining 335 the profile score for a user profile, the online system 140 retrieves objects and content items connected to the user profile via the graph. For each object connected to the user profile via the graph, the online system 140 determines an object score based on probabilities of reaching an identified user profile, an identified object, or an identified content item by traversing the connections in the graph from the object via a random walk. Similarly, the online system 140 determines a content item score based on probabilities of reaching an identified user profile, an identified object, or an identified content item from the content item by traversing the connections in the graph via a random walk. The online system 140 combines the content item score and the object score with the user profile score to determine a score for a user profile.

To identify user profiles likely to violate one or more enforced policies, the online system 140 generates 340 a model determining a likelihood that a user profile violates one or more of the enforced policies based on characteristics of the user profile. The online system 140 generates 340 the model based on profile scores determined 335 for various user profiles via the graph and characteristics of user profiles for which profile scores were determined 335. For example, the online system 140 trains a machine learned model using a profile score determined 335 for a user profile from the graph and characteristics of the user profile for which the profile score was determined. In some embodiments, the model is a gradient boosting decision tree model generated 340 from characteristics of user profiles and user profile scores determined 335 for each user profile via the graph.

The online system 140 subsequently applies the model to an additional user profile that is not included in the graph to determine a likelihood of the additional user violating one or more policies enforced by the online system 140. Based on characteristics of the additional user profile, the model determines a likelihood of the additional user profile violating one or more policies enforced by the online system 140. For example, when the online system 140 receives one or more content items associated with the additional user profile, the online system 140 applies the model to characteristics of the additional user profile. If the likelihood equals or exceeds a threshold value, the online system 140 performs one or more remedial actions regarding the additional user profile. For example, if the likelihood equals or exceeds the threshold value, the online system 140 identifies the additional user profile or received content items associated with the additional user profile for manual review for compliance with the one or more policies enforced by the online system 140. This allows the online system 140 to leverage connections between user profiles and other user profiles, objects, and content items identified as violating one or more of the enforced policies to identify user profiles for which the online system 140 has not determined connections to objects or content items likely to violate one or more of the enforced policies. Application of the model to characteristics of the additional user profile allows the online system 140 prevent various publishing users from circumventing policies enforced by the online system 140 by creating new user profiles for which the online system 140 has limited information to evaluate for compliance with the one or more enforced policies. Hence, the online system 140 uses connections between user profiles, content items, and objects to improve content presented to various users by more efficiently identifying user profiles likely to violate policies enforced by the online system 140.

While FIG. 3 describes generation of a model determining a likelihood of a user profile violating one or more policies enforced by the online system 140 based on connections between user profiles, content items, and objects, as well as user profiles, content items, and objects identified as violating one or more policies enforced by the online system 140, the method described in conjunction with FIG. 3 may be used to generate a model determining a likelihood of a content item or an object violating one or more policies enforced by the online system 140. By traversing connections in the graph between a content item or an object to user profiles, content items, or objects identified as violating one or more polices enforced by the online system 140, models determining likelihoods of content items or objects violating the enforced policies may be generated and subsequently applied to other content items or objects.

Figure 4:
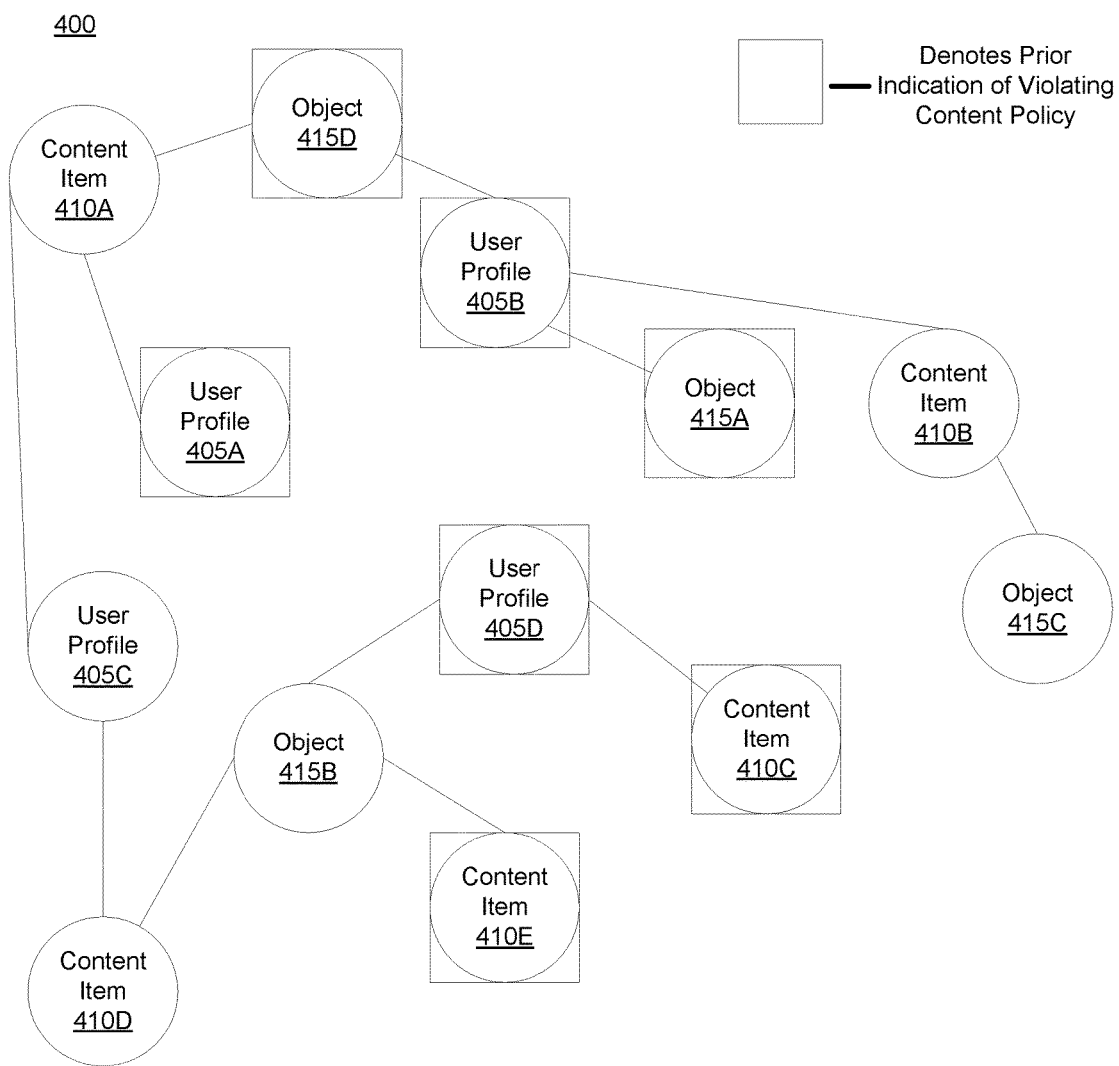
FIG. 4 is example graph generated by the online system identifying connections between on user profiles, objects, and content items obtained by the online system, in accordance with an embodiment.

FIG. 4 is an example graph 400 generated by the online system 140 based on user profiles, objects, and content items obtained by the online system 140. In the example of FIG. 4, the graph 400 includes connections between user profiles 405A, 405B, 405C, 405D (also referred to individually and collectively using reference number 405) and content items 410A, 410B, 410C, 410D, 410E (also referred to individually and collectively using reference number 410), connections between content items 410A, 410B, 410C, 410D, 410E and objects 415A, 415B, 415C (also referred to individually and collectively using reference number 415), and connections between user profiles 405A, 405B, 405C, 405D and objects 415A, 415B, 415C. As further described above in conjunction with FIG. 3, a connection between a user profile 405 and a content item 410 indicates a user associated with the user profile 405 is authorized to perform one or more actions associated with the content item 410 or that the content item 410 was obtained from the user associated with the user profile 405. Similarly, a connection between the user profile 405 and an object 415 indicates a user associated with the user profile 405 is authorized to perform one or more actions associated with the object 415. Further, a connection between a content item 410 and an object 415 indicates the object 415 is specific by the content item 410.

As further described above in conjunction with FIG. 3, the online system 140 enforces one or more policies to prevent certain content items (e.g., content items including harmful or offensive content) from being presented to various users. To enforce various policies, the online system 140 may identify a user profile 405 associated with one or more content items 410 or objects 415 that violate one or more policies and subsequently withhold presentation of content items 410 or objects 415 associated with the identified user profile 405 from presentation to other users. In the example of FIG. 4, the online system 140 has identified user profile 405A, user profile 405B, and user profile 405D as violating at least one policy enforced by the online system 140. Similarly, the online system 140 identifies content items 410 or objects 415 violating at least one policy enforced by the online system 140. In the example of FIG. 4, the online system 140 identifies content item 410C and content item 410E as violating at least one policy enforced by the online system 140; similarly, the online system 140 identifies object 415A and object 415D as violating at least one policy enforced by the online system 140.

Based on the connections between user profiles 405 and content items 410, between content items 410 and objects 415, and between objects 415 and user profiles 405, the online system 140 determines profile scores for various user profiles 405 included in the graph 400. As further described above in conjunction with FIG. 3, a profile score for a user profile 405 is determined based on a likelihood of traversing between user profiles 405 and content items 410, between content items 410 and objects 415, and between objects 415 and user profiles 405 in the graph 400 from the user profile 405 to a user profile 405, a content item 410, or an object 415 determined to violate at least one policy enforced by the online system 140. For example, in FIG. 4, a profile score for user profile 405C is determined as a probability of traversing connections between user profiles 405 and content items 410, between content items 410 and objects 415, and between objects 415 and user profiles 405 to traverse the graph from user profile 405C to user profile 405A, user profile 405B, user profile 405D, content item 410C, content item 410D, content item 410E, object 415A, or object 415D, which were previously identified as violating at least one policy enforced by the online system 140. In some embodiments, the online system 140 determines a probability of traversing the graph 400 from a user profile 405 to a user profile 405 identified as violating at least one policy enforced by the online system 140, a probability of traversing the graph 400 from the user profile 405 to a content item 410 identified as violating at least one policy enforced by the online system 140, and a probability of traversing the graph 400 from the user profile to an object 415 identified as violating at least one policy enforced by the online system 140. The online system 140 combines the probability of traversing the graph 400 from a user profile 405 to a user profile 405 identified as violating at least one policy enforced by the online system 140, the probability of traversing the graph 400 from the user profile 405 to a content item 410 identified as violating at least one policy enforced by the online system 140, and the probability of traversing the graph 400 from the user profile to an object 415 identified as violating at least one policy enforced by the online system 140 to determine the profile score for the user profile 405 in various embodiments.

Additionally, the online system 140 may account for probabilities of traversing the graph 400 from content items 410 or objects 415 connected to a user profile 405 to a user profile 405, a content item 410, or an object 415 identified as violating at least one policy enforced by the online system 140. Referring to the previous example, to determine the profile score for user profile 405C, the online system 140 also determines probabilities of traversing the graph 400 from content item 410A and content item 410D to user profile 405A, user profile 405B, user profile 405D, content item 410C, content item 410D, content item 410E, object 415A, or object 415D, which were previously identified as violating at least one policy enforced by the online system 140. The online system 140 combines the probabilities of traversing the graph 400 from content items 410 or objects 415 connected to a user profile 405 to a user profile 405, a content item 410, or an object 415 identified as violating at least one policy enforced by the online system 140 and the probability of traversing the graph 400 from the user profile 405 to a user profile 405, a content item 410, or an object 415 identified as violating at least one policy enforced by the online system 140 to determine the profile score for the user profile 405.

As further described above in conjunction with FIG. 3, based on profile scores for various user profiles 405 included in the graph 400 and characteristics of the user profiles 405, the online system 140 generates a model determining a likelihood of a user profile that is not included in the graph 400 violating one or more policies enforced by the online system 140. Generating the model allows the online system 140 to leverage information about user profiles 405, content items 410, and objects 415 identified as violating at least one policy enforced by the online system 140 and connections between user profiles 405 and content items 410, between content items 410 and objects 415, and between objects 415 and user profiles 405 to determine whether recently established user profiles are likely to violate one or more policies enforced by the online system 140. This allows the online system 140 to more proactively evaluate certain user profiles for compliance with policies enforced by the online system 140, reducing a likelihood of the online system 140 presenting content items associated with a user profile violating one or more enforced policies to users.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
maintaining, at an online system, user profiles associated with various users of the online system;
obtaining content items at the online system, each content item associated with one or more user profiles maintained by the online system and specifying an object maintained by the online system;
determining connections between each of a set of the user profiles and content items associated with each of the set of the user profiles;
determining connections between content items and objects maintained by the online system and specified by the content items, a connection established between a content item and an object specified by the content item;
determining connections between objects maintained by the online system and user profiles of the set authorized to perform one or more actions associated with the objects;
identifying user profiles of the set of the user profiles, content items associated with each of the set of the user profiles, and objects specified by the content items previously determined to have violated one or more policies enforced by the online system;
determining profile scores for one or more user profiles, a profile score for a specific user profile based on one or more of: connections between the specific user profile and identified content items, connections between content items and identified objects specified by the content items, and connections between identified objects and each of the set of user profiles; and
generating a model for determining likelihoods of one or more user profiles violating one or more policies enforced by the online system based on the determined profile scores and characteristics of user profiles corresponding to determined profile scores.

2. The method of claim 1, wherein determining profile scores for one or more user profiles comprises:
determining a probability of reaching an identified content item from the specific user profile based on connections between the specific user profile and content items, connections between content items and objects specified by the content items, and connections between objects and each of the set of user profiles;
determining a probability of reaching an identified object from the specific user profile based on connections between the specific user profile and content items, connections between content items and objects specified by the content items, and connections between objects and each of the set of user profiles;
determining a probability of reaching an identified user profile from the specific user profile based on connections between the specific user profile and content items, connections between content items and objects specified by the content items, and connections between content items and each of the set of user profiles; and
determining the profile score as a combination of the probability of reaching the identified content item, the probability of reaching the identified object, and the probability of reaching the identified user profile.

3. The method of claim 1, wherein generating the model for identifying user profiles likely to violate one or more policies enforced by the online system based on the determined profile scores comprises:
determining content item scores for one or more content items connected to the specific user profile, a content item score for a specific content item based on one or more of: connections between the specific content item and identified user profiles, connections between the specific content item and identified objects specified by the content items, and connections between objects and identified user profiles; and generating the model for identifying user profiles likely to violate one or more policies enforced by the online system based on the profile scores and on the content item scores.

4. The method of claim 3, wherein determining content item scores for one or more content items comprises:

determining a probability of reaching an identified content item from the specific content item based on connections between the specific content item and user profiles of the set, connections between content items and objects specified by the content items, and connections between user profiles of the set and content items;

determining a probability of reaching an identified object from the specific content item based on connections between the specific content item and user profiles of the set, connections between content items and objects specified by the content items, and connections between user profiles of the set and content items;

determining a probability of reaching an identified user profile from the specific content item based on connections between the specific content item and user profiles of the set, connections between content items and objects specified by the content items, and connections between user profiles of the set and content items; and determining the content item score as a combination of the probability of reaching the identified content item, the probability of reaching the identified object, and the probability of reaching the identified user profile.

5. The method of claim 3, wherein generating the model for identifying user profiles likely to violate one or more policies enforced by the online system based on the determined profile scores comprises:

determining object scores for one or more objects, an object score for a specific object based on one or more of: connections between the specific object and identified users, connections between the specific object and identified content items, and connections between identified user profiles and content items; and generating the model for identifying user profiles likely to violate one or more policies enforced by the online system based on the profile scores, on the content item scores, and on the object scores.

6. The method of claim 5, wherein determining object scores for one or more content items comprises:

determining an additional probability of reaching an identified content item from the specific object based on connections between the specific object and content items, connections between content items and user profiles of the set, connections between content items and objects specified by the content items, and connections between user profiles of the set and content items;

determining an additional probability of reaching an identified object from the specific object based on connections between the specific object and content items, connections between content items and user profiles of the set, connections between content items and objects specified by the content items, and connections between user profiles of the set and content items;

determining an additional probability of reaching an identified user profile from the specific object based on connections between the specific object and content items, connections between content items and user profiles of the set, connections between content items and objects specified by the content items, and connections between user profiles of the set and content items; and determining the object score as a combination of the additional probability of reaching the identified content item, the additional probability of reaching the identified object, and the additional probability of reaching the identified user profile.

7. The method of claim 1, further comprising:

obtaining an additional user profile for which the online system has not determined connections with one or more content items or connections with one or more objects; and determining a likelihood of the additional user profile violating one or more policies enforced by the online system by applying the model to characteristics of the additional user profile.

8. The method of claim 7, further comprising:

performing one or more remedial actions regarding the additional user profile in response to the likelihood of the additional user profile violating one or more policies enforced by the online system equaling or exceeding a threshold.

9. The method of claim 8, wherein a remedial action comprises identifying the additional user profile for manual review.

10. The method of claim 1, wherein the object specified by a content item comprises a page maintained by the online system.

11. A method comprising:

maintaining, at an online system, user profiles associated with various users of the online system;

obtaining content items at the online system, each content item associated with one or more user profiles maintained by the online system and specifying an object maintained by the online system;

maintaining objects at the online system, each object associated with one or more user profiles and at least a set of objects specified by one or more content items obtained by the online system;

determining connections between each of a set of the user profiles and content items associated with each of the set of the user profiles, a connection between a content item and a user profile indicating the user profile is authorized to perform one or more actions associated with the content item;

determining connections between content items and objects, a connection between the content item and an object indicating the content item specifies the object;

determining connections between objects maintained by the online system and user profiles of the set, a connection between the user profile and the object indicating the user profile is authorized to perform one or more actions associated with the object;

generating a graph based on the connections between each of a set of the user profiles and content items associated with each of the set, the connections between content items and objects, and the connections between objects maintained by the online system and user profiles of the set;

identifying user profiles of the set of the user profiles, content items, and objects within the graph previously determined to have violated one or more policies enforced by the online system;

determining profile scores for one or more user profiles based on the connections between each of the set of the user profiles and content items associated with each of the set of the user profiles, the connections between content items and objects, and the connections between objects maintained by the online system and user profiles of the set; and generating a model for determining likelihoods of one or more user profiles violating one or more policies enforced by the online system based on the determined profile scores and characteristics of user profiles corresponding to determined profile scores.

12. The method of claim 11, wherein determining profile scores for one or more user profiles based on the connections between each of the set of the user profiles and content items associated with each of the set of the user profiles, the connections between content items and objects, and the connections between objects maintained by the online system and user profiles of the set comprises:

determining a profile score for the user profile based on a probability of traversing the graph from the user profile to an identified user profile, to an identified content item, or to an identified object based on the connections between each of the set of the user profiles and content items associated with each of the set of the user profiles, the connections between content items and objects, and the connections between objects maintained by the online system and user profiles of the set.

13. The method of claim 12, wherein on the probability of traversing the graph from the user profile to the identified user profile, to the identified content item, or to the identified object is based on a probability of a random walk through the graph from the user profile reaching the identified user profile, to the identified content item, or to the identified object.

14. The method of claim 11, further comprising:

obtaining an additional user profile for which the online system has not determined connections with one or more content items or connections with one or more objects; and determining a likelihood of the additional user profile violating one or more policies enforced by the online system by applying the model to characteristics of the additional user profile.

15. The method of claim 14, further comprising:

performing one or more remedial actions regarding the additional user profile in response to the likelihood of the additional user profile violating one or more policies enforced by the online system equaling or exceeding a threshold.

16. The method of claim 11, wherein one or more of the objects comprise pages of content.

17. A computer program product comprising a non-transitory computer readable storage medium having instructions encoded thereon that, when executed by a processor, cause the processor to:

maintain, at an online system, user profiles associated with various users of the online system;

obtain content items at the online system, each content item associated with one or more user profiles maintained by the online system and specifying an object maintained by the online system;

maintain objects at the online system, each object associated with one or more user profiles and at least a set of objects specified by one or more content items obtained by the online system;

determine connections between each of a set of the user profiles and content items associated with each of the set of the user profiles, a connection between a content item and a user profile indicating the user profile is authorized to perform one or more actions associated with the content item;

determine connections between content items and objects, a connection between the content item and an object indicating the content item specifies the object;

determine connections between objects maintained by the online system and user profiles of the set, a connection between the user profile and the object indicating the user profile is authorized to perform one or more actions associated with the object;

generate a graph based on the connections between each of a set of the user profiles and content items associated with each of the set, the connections between content items and objects, and the connections between objects maintained by the online system and user profiles of the set;

identify user profiles of the set of the user profiles, content items, and objects within the graph previously determined to have violated one or more policies enforced by the online system;

determine profile scores for one or more user profiles based on the connections between each of the set of the user profiles and content items associated with each of the set of the user profiles, the connections between content items and objects, and the connections between objects maintained by the online system and user profiles of the set; and generate a model for determining likelihoods of one or more user profiles violating one or more policies enforced by the online system based on the determined profile scores and characteristics of user profiles corresponding to determined profile scores.

18. The computer program product of claim 17, wherein determine profile scores for one or more user profiles based on the connections between each of the set of the user profiles and content items associated with each of the set of the user profiles, the connections between content items and objects, and the connections between objects maintained by the online system and user profiles of the set comprises:

determine a profile score for the user profile based on a probability of traversing the graph from the user profile to an identified user profile, to an identified content item, or to an identified object based on the connections between each of the set of the user profiles and content items associated with each of the set of the user profiles, the connections between content items and objects, and the connections between objects maintained by the online system and user profiles of the set.

19. The computer program product of claim 17, wherein the non-transitory computer readable storage medium further has instructions encoded thereon that, when executed by the processor, cause the processor to:

obtain an additional user profile for which the online system has not determined connections with one or more content items or connections with one or more objects; and determine a likelihood of the additional user profile violating one or more policies enforced by the online system by applying the model to characteristics of the additional user profile.

20. The computer program product of claim 17, wherein the non-transitory computer readable storage medium further has instructions encoded thereon that, when executed by the processor, cause the processor to:

perform one or more remedial actions regarding the additional user profile in response to the likelihood of the additional user profile violating one or more policies enforced by the online system equaling or exceeding a threshold.

\* \* \* \* \*